United States Patent [19]

Noda

[11] Patent Number: 5,171,344
[45] Date of Patent: Dec. 15, 1992

[54] METHOD FOR MANUFACTURING A GRADIENT INDEX OPTICAL ELEMENT

[75] Inventor: Satoshi Noda, Akishima, Japan

[73] Assignee: Olympus Optical Company Limited, Japan

[21] Appl. No.: 717,417

[22] Filed: Jun. 18, 1991

[30] Foreign Application Priority Data

Jun. 20, 1990 [JP] Japan .................. 2-162139

[51] Int. Cl.$^5$ .............................. C03C 25/02
[52] U.S. Cl. .................... 65/3.11; 65/3.12; 65/18.1; 65/30.1; 65/90.1; 385/124
[58] Field of Search ............ 65/3.11, 3.12, 3.14, 65/3.15, 18.1, 18.2, 30.1, 30.13, 901; 385/124; 359/654

[56] References Cited

U.S. PATENT DOCUMENTS

| | | | |
|---|---|---|---|
| 4,462,663 | 7/1984 | Shimizu et al. | 359/654 |
| 4,478,623 | 10/1984 | Olshansky | 65/3.12 |
| 4,563,205 | 1/1986 | Asahara | 65/30.13 |
| 4,576,836 | 3/1986 | Colmet et al. | 427/255 |
| 4,907,864 | 3/1990 | Hagerty et al. | 359/654 |

Primary Examiner—Robert L. Lindsay
Attorney, Agent, or Firm—Bruce L. Adams; Van C. Wilks

[57] ABSTRACT

In accordance with the present invention, the dopant within one gradient index optical element has two independent concentration distributions. Particularly to use the present invention to obtain a gradient index optical element having an excellent chromatic aberration correction ability, it is only needed to make such dopant distributions as shown in the previously stated Japanese Patent Application No. 280897/1989. However, as to the doping of a dopant into a porous body, there is a limit in the amount which can be doped. This is a disadvantage of the molecular stuffing method, but the reason for this is that the dopant must be supplied into the holes as a solution and it is largely restricted by the solubility of the dopant in the solvent. In addition, since the intra-hole fixing of the dopant depends on the solubility difference by temperature or that by solvent exchange, it is further restricted. For this, the latter process which is an application of the molecular stuffing method preferably takes the distribution that has less doping amount.

Accordingly, a large concentration distribution must be provided to the dopant in the preceding process. For that, the preceding process is desirably a gel which has sufficiently large concentration gradient by the sol-gel method. However, the sol-gel method also has a defect, in which the distribution provision relies on the elution of the dopant metal, and thus a convex distribution is easier to produce in principle.

In view of the foregoing, it is the most effective that the concentration gradient of the first dopant is formed in a convex shape by the sol-gel method using alcoxide as the raw material for retreiving the first dopant, and that the concentration gradient of the second dopant is formed in a concave shape by an application of the molecular stuffing method.

12 Claims, 2 Drawing Sheets

$\nu d$ : FIXED

IDEAL CONDITION

METHOD FOR MANUFACTURING A GRADIENT INDEX OPTICAL ELEMENT

BACKGROUND OF THE INVENTION

1. Field of the Invention

The present invention is related to a method for manufacturing gradient index optical elements.

2. Prior Art

Gradient index optical elements have attracted attention because of their excellent aberration correction ability as optics which are essential to the next generation optical systems.

There are various gradient index optical elements which are being researched and developed in many companies and research institutes, including the SELFOC (a registered trademark) lens and slab lens which are already available in the market.

In gradient index optical elements, their medium itself is provided with a power (refractive power) by adding a refractive index distribution. The power depends on the refractive index distribution, and it is only necessary to increase the gradient difference of refractive index n (hereinafter referred to as $\Delta n$) in order to increase the power. Accordingly, at present, to increase the $\Delta n$ is a large problem given to the research and development of gradient index optical elements, and many researchers are studying how to increase the $\Delta n$. For instance, for the optics which are marketed under the name of SELFOC lens, the $\Delta n$ is increased by providing a concentration gradient of Tl by ion exchange. Also, by providing a concentration gradient of Ag using a double ion exchange method, a lens was obtained for which $\Delta n \approx 0.1$ (the 28th Discussion on Glass).

In addition, by the sol-gel method, a lens for which $\Delta n = 0.04$ was obtained by providing concentration gradients of Pb and K (J. Non-cry. sol. 100, 506, 1988), and a lens for which $\Delta n = 0.03$ was obtained by providing a concentration gradient of Ti or Ge (Elect. Lett, 22, 99 (1986), Elect. Lett, 22, 1108 (1986)).

Incidentally, the developments of gradient index optical elements up to the present have mainly an approach of increasing the outer diameter, but the measures to decrease the chromatic aberration possessed by the optics themselves have been late. Since refractive index distribution type optics have excellent aberration correction ability, it is possible to drastically decrease the number of the constituent lenses, but there is an inconsistency that the chromatic aberration correction of a lens system becomes more difficult as the number of the lenses decreases. Accordingly, to make a lens system which includes a gradient index optical elements and has the chromatic aberration thereof fully corrected, it may be needed to take measures such as addition of an achromatic lens depending on the case, and thus the merit of the gradient index optical elements is reduced by half.

Thus, to make a lens system in which the number of lenses is small and the chromatic aberration is also corrected, it is important to decrease the chromatic aberration itself generated in each lens and it is important to decrease the chromatic aberration of the gradient index optical elements itself. For this, the following characteristics are desired as the characteristics required for the medium of gradient index optical elements.

In radial gradient index optical elements, the refractive index of the medium differs depending on the position through which a light beam is passing (the distance from the axis), and hence the refractive index of the light beam differs. If it is now supposed that the Abbe number $$v_d \left[ = \frac{n_d - 1}{n_F - n_C} \right]$$

of the medium is constant, then in a portion having a high refractive index, the light beam as it passes through the medium largely refracts as shown in FIG. 1 (a), so that the spread due to the difference in the wavelength of the light beam becomes large as compared with a portion having a low refractive index. That is, if the Abbe number $v_d$ is fixed, the chromatic aberration $(n_F - n_C)$ increases as the refractive index $n_d$ increases. Consequently, in order to decrease the chromatic aberration $(n_F - n_C)$, it is desirable that the Abbe number $v_d$ is large in the portion having a high refractive index as shown in FIG. 1 (b). That is, the characteristics changing in the form of high refractive index-low dispersion—low refractive index-high dispersion are desirable as the characteristics of the medium.

Also, axial gradient index optical elements can be considered similarly to the conclusion obtained for the conventional achromatic junction lens (tablet) shown in FIGS. 2 (a) and (b). Thus, in axial gradient index optical elements, the junction of a high-refractive index medium lens with a low-refractive index medium lens is achieved by providing the medium with a refractive index distribution within the same lens as shown in FIGS. 2 (c) and (d), and it is therefore desirable for the characteristics to vary in the form of high refractive index-low dispersion—low refractive index-high dispersion similarly to radial gradient index optical elements. This indicates that optics whose optical characteristics change in the direction A on the $n_d - v_d$ graph shown in FIG. 3 are more excellent in the point of chromatic aberration correction than those having optical characteristics that change in the direction B (refer to the Japanese Patent Application Laid-Open No. 218614/1985 official gazette).

However, few of the gradient index optical elements which are presently being developed have such characteristics and even in those which have already been actualized, $\Delta n$ remains to be a very small value.

That is mainly caused by the manufacturing method of gradient index optical elements. For instance, in the ion exchange method, in order to make $\Delta n$ large, a concentration gradient is provided by the ion exchange between Tl+ ions having a valence of one, which are introduced into glass so as to constitute a glass modification oxide (that is not directly related to the glass formation), and N+ or K+ ions. But, the use of Tl+ makes $\Delta n$ large whereas the change characteristics of the Abbe number becomes a high refractive index-high dispersion—low refractive index-low dispersion type, and thus a chromatic aberration will largely occur. Also, $\Delta n$ can be made large by the exchange of Ag+ with Na+, but a large chromatic aberration will similarly occur.

In addition, there is an instance in which the chromatic aberration is significantly improved using Li+, but on the other hand, $\Delta n$ becomes small and its effect is not fully exhibited. Although $\Delta n$ can be improved by increasing the content of Li+, there is a limit because of the resistance of the glass body material and the difficulty of the technique of stably dissolving the easily volatile alkali content into the glass body material, and the one of a level which actually exhibits a sufficient effect has not yet been obtained.

Since, in the ion exchange method, a concentration gradient can essentially be provided only by positive ions having a valence of one because the exchange speed of ions having a valence larger than one is extremely low, the variations of the ion concentration gradient for providing the distribution thereof are very limited, and thus the one has not yet been achieved in which $\Delta n$ is large and the occurrence of a chromatic aberration is low as described above.

Further, the development by the sol-gel method is now proceeded with, and there is a method wherein a metal element such as Ti, Ge or Zr which enhances the refractive index and constitutes the glass forming oxide (that is originally contained for forming glass) is eluted from a wet gel by an acid or the like. In this method, the change characteristics of the Abbe number are of the high refractive index·high dispersion—low refractive index·low dispersion type though a $\Delta n$ which is large to some extent is obtained, and thus a chromatic aberration largely occurs and the characteristics of the gradient index optical elements are near to those obtained by the ion exchange of the $Tl^+$-$Na^+$ type.

Also, in the Japanese Patent Publication No. 15492/1987 official gazette, it is shown that chromatic aberration (dispersion) can be made small using Nb, Ta, Sc, Y, La or Th as a dopant metal. However, this method has no difference in that dispersion changes from a high dispersion to a low dispersion as the refractive index changes from a high refractive index to a low refractive index, and the amount of change in its dispersion value is merely small. That is, since the dispersion is eventually shown by the reciprocal of the Abbe number, the method described in the Japanese Patent Publication No. 15492/1987 official gazette has no difference in that it is the dispersion of the direction B in FIG. 3 of the specification of this application, and its angle is merely made such that the arrow in the figure stands.

Moreover, in the Japanese Patent Publication No. 6295/1985 official gazette, a multiple-dope method is disclosed in which a molecular stuffing method is repeated. But, this method had two problems that a $\Delta n$ which can practically be used is not obtained because of the small amount of a dopant that can be doped at a time, and that it relies on an impractical process in which a baking at a high temperature in a furnace is performed for each doping.

The present invention was made in view of such prior art problems, and its object is to provide a method for manufacturing gradient index optical elements having various characteristics, including gradient index optical elements having an excellent chromatic aberration correction ability, in which $\Delta n$ is large enough for practical use and the characteristics change of the Abbe number is of a high refractive index·low dispersion—low refractive index·high dispersion type.

SUMMARY OF THE INVENTION

In order to accomplish the above object, the method for manufacturing gradient index optical elements has a process of forming a porous body having a first predetermined concentration gradient due to a first dopant incorporated into the porous body thereof and a process of dipping the porous body in a solution containing a second dopant, thereby to provide the porous body with a second predetermined concentration gradient due to the second dopant.

In the method for manufacturing gradient index optical elements, the porous body having the first predetermined concentration gradient may be a gel synthesized by a sol-gel method using alcoxide as the raw material for receiving the dopant, or soot synthesized by a CVD method for receiving the dopant.

In the method for manufacturing gradient index optical elements, the first predetermined concentration gradient may be such that the concentration of the first dopant gradually becomes lower from the center of the porous body toward the outside thereof, and the second predetermined concentration gradient is such that the concentration of the second dopant gradually becomes high from the center of the porous body toward the outside thereof.

In the method for manufacturing gradient index optical elements of the present invention having the above described construction, since a porous body is formed which has a first predetermined concentration gradient due to a first dopant previously incorporated into the porous body, the doping amount of the first dopant can be made large, and thus $\Delta n$ can be made sufficiently large. In addition, in the present invention, since a second predetermined concentration gradient due to a second dopant is provided to the porous body having the first predetermined concentration gradient by dipping the porous body in a solution containing the second dopant, the second concentration gradient can be made independent of the first concentration gradient. Accordingly, in accordance with the present invention, gradient index optical elements can be obtained which have various distribution characteristics that could not ever been thought of in the prior art. For instance, if a dopant which enhances the refractive index is selected as the first dopant and a dopant which enhances the Abbe number is selected as the second dopant, optics having an excellent chromatic aberration correction ability can be obtained in which $\Delta n$ is sufficiently large and the refractive index and dispersion are of the type of high refractive index·low dispersion—low refractive index·high dispersion.

It is shown in Japanese Patent Application No. 280897/1989 that in order to obtain gradient index optical elements of the high refractive index·low dispersion—low refractive index·high dispersion type which have an excellent chromatic aberration correction ability, it is only needed to provide concave and convex dependent multiple distributions by a combination of selected metals in one gradient index optical elements. According to the present invention, a glass body having such distributions can be manufactured. In this case, it is preferable to use at least one metal selected from a group of Ba, La, Sr, Ca, Ge, Zr, Y and Zn as the first dopant, and at least one or more metals selected from a group of Ta, Nb, Pb, Ti, Bi, Zn and Zr as the second dopant, respectively.

In addition, a concentration gradient of the "convex type" means a distribution in which, if a bar-shaped optic like FIG. 4 (a) is considered for instance and if the distance r from the center thereof and the ion concentration are plotted on the abscissa and ordinate, respectively, then the concentration gradually becomes lower from the center toward the outside like FIG. 4(b). The concave type is the opposite to this.

Also, it is possible that a metal acting to enhance the refractive index is selected as the first dopant and a porous body provided with a concentration gradient by this metal is previously formed, and then a metal which enhances the refractive index is selected as the second dopant and a larger concentration gradient is provided to the dopant acting to enhance the refractive index by dipping the porous body in a solution containing the second dopant, thereby providing multiple dopings.

As the method for forming a porous body having a first predetermined concentration gradient due to a first dopant incorporated into the porous body, the following two are preferably used.

In one method, a wet gel is first created by the sol-gel method using alcoxide as the raw material for the dopant, and after an appropriate maturing, the gel has the dopant eluted by an appropriate eluant and is thereafter dried, thereby obtaining a dry gel which has the concentration gradient of the first dopant metal in the porous body. The reason for using alcoxide as the raw material for receiving the dopant here is that, in the sol-gel method using a metallic salt such as nitrate as the raw material of the dopant, it is considered that the metallic salt only deposits between the Si frames and forms a concentration distribution, so that the dopant distribution provided in the first process collapses because the dissolution and re-dispersion occur when the dry gel is dipped in a solvent, whereas for the dry gel synthesized using alcoxide as the raw material, for receiving the dopant gel combine in the form of Si-O-M in the gel frame or porous body and are fixed without being eluted by a conventional solvent, so that the dopant distribution never collapses.

Also, although the dry gel may be used as it is dried, it may also be used after it is calcinated to strengthen the frame of the gel or porous body. Further, it may be used in the state of a wet gel before calcinated.

In the other method, a soot having a concentration gradient is obtained as the dopant metal, which is synthesized by feeding a chloride of $SiCl_4$ and a dopant metal or the like into an oxygen-hydrogen burner along with a carrier gas by means of the CVD method (VAD method), and simultaneously providing a temperature distribution onto a substrate for controlling the reactivity of the chloride of the dopant metal. A soot is an aggregate of a fine glass powder synthesized by a gaseous phase reaction. Accordingly, it has many voids and the metal is vitrified so that it is stably fixed without being eluted by a conventional solvent.

In the subsequent process, the concentration gradient of a second dopant different from the obtained first dopant is given into the porous body which has the first concentration gradient due to the first dopant.

This is somewhat different depending on whether a concave or convex distribution is provided to the dopant. First, for the provision of a convex distribution, it is by a very conventional molecular stuffing method. That is, the porous body obtained in the preceding process is dipped in the solution of the second dopant and fully stuffed, and thereafter the porous body is dipped in an appropriate solvent to unstuff the second dopant, thereby providing the second dopant with a convex concentration gradient.

Then, for the provision of a concave distribution, first the porous body obtained in the preceding process is dipped in an appropriate solvent, thereby sufficiently filling the holes or pores in the porous body with the solvent. Next, this is dipped in the solvent of the second dopant, thereby providing the second dopant with a concave concentration gradient. Incidentally, when the wet gel obtained by the sol-gel method is used. the "dipping into an appropriate solvent" of the first half can be eliminated.

After providing a concentration gradient to the second dopant, the distribution fixing and drying are performed, and thereafter the baking is done to form a dense glass body.

In accordance with the present invention, the dopant within one gradient index optical element has two independent concentration distributions. Particularly to use the present invention to obtain a gradient index optical element having an excellent chromatic aberration correction ability, it is only needed to make such dopant distributions as shown in the previously stated Japanese Patent Application No. 280897/1989. However, as to the doping of a dopant into a porous body, there is a limit in the amount which can be doped. This is a disadvantage of the molecular stuffing method, but the reason for this is that the dopant must be supplied into the holes as a solution and it is largely restricted by the solubility of the dopant in the solvent. In addition, since the intra-hole fixing of the dopant depends on the solubility difference by temperature or that by solvent exchange, it is further restricted. For this, the latter process which is an application of the molecular stuffing method preferably takes the distribution that has less doping amount.

Accordingly, a large concentration distribution must be provided to the dopant in the preceding process. For that, the preceding process is desirably a gel which has sufficiently large concentration gradient by the sol-gel method. However, the sol-gel method also has a defect, in which the distribution provision relies on the elution of the dopant metal, and thus a convex distribution is easier to produce in principle.

In view of the foregoing, it is most effective that the concentration gradient of the first dopant is formed in a convex shape by the sol-gel method using alcoxide as the raw material for receiving the dopant, and that the concentration gradient of the second dopant is formed in a concave shape by an application of the molecular stuffing method.

DETAILED DESCRIPTION OF THE PREFERRED EMBODIMENTS

(First Embodiment)

5.7 g of zirconium-n-butoxide was dissolved in 18.3 ml of n-butanol solution and dropped in a solution which was partially hydrolyzed by 12.6 ml of silicon tetramethoxide, 18.3 ml of n-butanol and 1.5 ml of 2N (2 Normality)-hydro-chloric acid, and a mixed solution of 13.7 ml of n-butanol, 3.9 ml of N-N dimethyl formamide and 22.5 ml of 0.3 N-ammonia water was dropped in to adjust the sol. This sol was poured in a polypropylene container having a diameter of 18 mm ($\phi$18), which was sealed and placed in a furnace of 50° C. to set the sol, and thereafter it was matured as it was.

Then, after it was dipped in sulfuric acid of 3N and given with a distribution of zirconium, it was dried and a dry gel was obtained which had a convex concentration gradient in zirconium.

After dipping the dry gel in ethanol to fill the pores of the dry gel with ethanol, by dipping it in the ethanol solution of titanium chloride for two hours and again dipping it in diethyl ether, the solvent in the gel was replaced to cause titanium chloride to separate out in the inner wall of the gel pores, and the fixing of the distribution was provided and then it was dried.

The dry gel created by this had a concave concentration gradient of titanium chloride in the pores while keeping the previous convex distribution of zirconium.

Finally, when the dry gel was placed in a tubular furnace and heated to 1100° C. for baking, a transparent glass body having no pores were obtained.

Figure 1A:
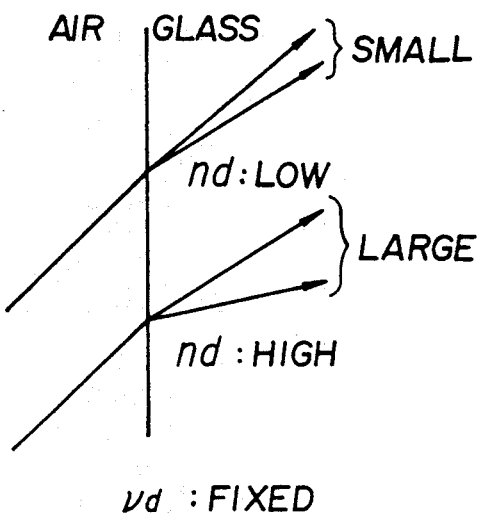
FIGS. 1 (a) and (b) are light path diagrams for explaining the relationship between refractive index and dispersion or radial gradient index optical elements, respectively.
Figure 1B:
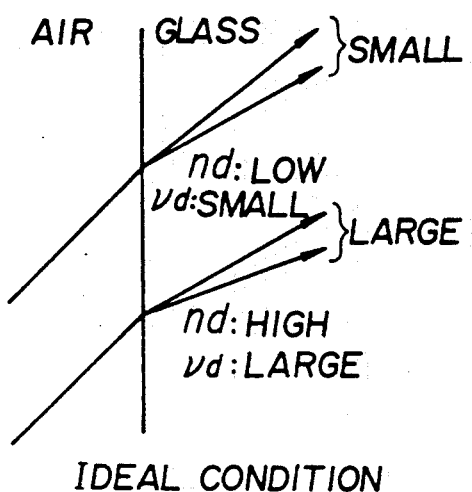
Figure 2A:
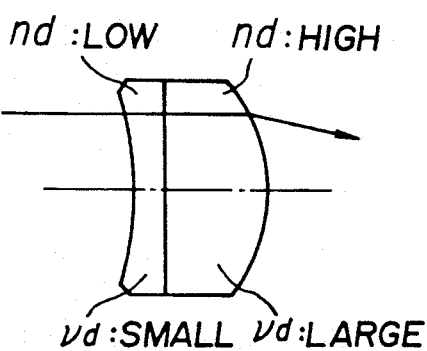
FIGS. 2 (a) through (d) are light path diagrams for explaining the relationship between refractive index and dispersion of axial gradient index optical elements, respectively.
Figure 2B:
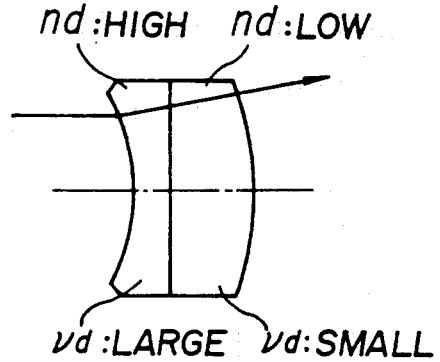
Figure 2C:
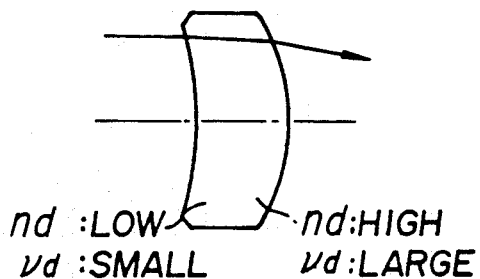
Figure 2D:
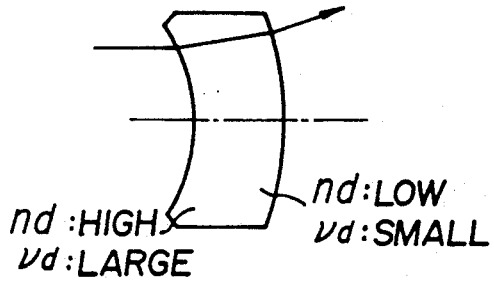
Figure 3:
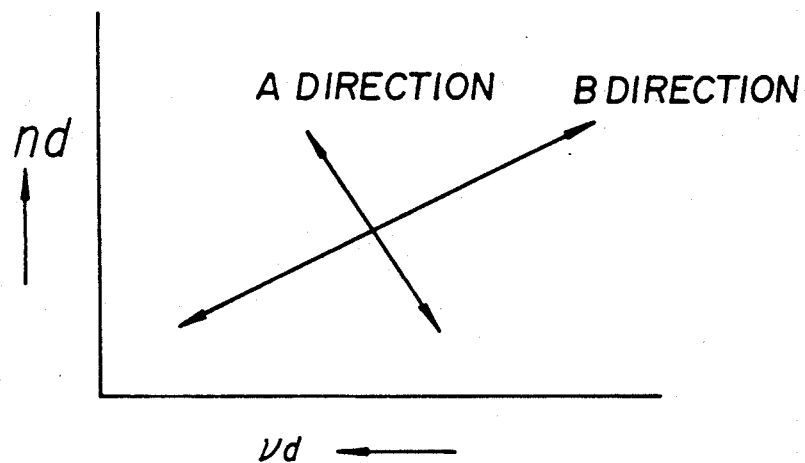
FIG. 3 is a graph showing refractive index - dispersion characteristics.
Figure 4A:
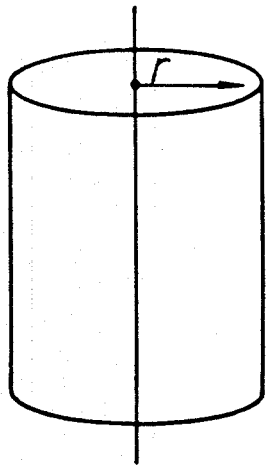
FIGS. 4 (a) and (b) are a perspective view and a graph for explaining a type of concentration gradient, respectively.
Figure 4B:
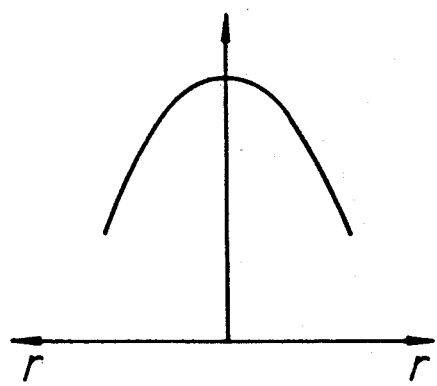

Concentration distributions of zirconium and titanium chloride existed in the glass body, and the refractive index became lower from the center of the glass to the perimetry thereof and the Abbe number was also reduced. This is the characteristics of the direction A in FIG. 3 (decreasing toward the right-hand side).

(Second Embodiment)

Using $SiCl_4$ and $GeCl_4$ as the raw material gas, a soot having a diameter of 10 mm ($\phi$10) was synthesized by the VAD method so that it was comprised of 85 mol %-$SiO_2$ and 15 mol %-$GeO_2$ in the central composition.

The soot was dipped in water to cause water to fully penetrate into the inside of the soot, and thereafter dipped in a water solution of $Pg(CH_3COO)_2$ of 0.5 mol/l for 50 minutes.

Then, the soot was quickly dipped in acetone of 0° C. to fix the Pb distribution, and after dried, it was baked, whereby a transparent glass body was obtained.

The glass body had a convex concentration distribution of Ge and a concave concentration distribution of Pb in the sinside thereof, and had dispersion characteristics similar to First Embodiment.

(Third Embodiment)

Yttrium-tripropoxide was dissolved in an appropriate solvent, which was added to a partially hydrolyzed solution of silicon tetraethoxide and refluxed and heated for one hour.

A mixed solution of formamide and dilute ammonia water was dropped into this solution while being stirred, thereby obtaining a sol. This was set to a gel in a furnace of 60° C. and matured for several days, and thereafter dipped in 3N-hydrochloric acid to provide a convex concentration distribution of yttrium in the gel.

The gel was dipped in i-propanol, and after washing the residual salt in the gel, it was subsequently dipped in an i-propanol solution of titanium tetra-i-propoxide without being dried, thereby to provide a concave distribution of titanium in the gel.

Thereafter, the gel was dried and baked to obtain a transparent glass body.

In the glass body, yttrium had a convex concentration distribution and titanium had a convex concentration distribution, and it had optical characteristics similar to First Embodiment.

Although the embodiments have been described in consideration of radial gradient index optical elements, it should be understood that the present invention can also be applied in axial gradient index optical elements by changing the shape of the porous body comprised of a gel or soot.

In addition, by the directions of the two distributions same, an optic having both $\Delta n$'s possessed by the respective distributions may be manufactured, control of the distributions particularly in the outer perimetry (control of higher degree terms of the distribution factors) may be made by multiplexing the distributions independently of the directions of the two distributions.

Thus, a wide variety of optics having various characteristics can be manufactured.

EFFECT OF THE INVENTION

As described above, in accordance with the method for manufacturing gradient index optical elements of the present invention, gradient index optical elements having various characteristics can be obtained which have not been accomplished only by the simple concentration distribution of a dopant.

Particularly, refractive index distribution type optics having an excellent chromatic aberration correction ability can be obtained, in which $\Delta n$ is large enough for practical use and the characteristics change of the Abbe number is of a high refractive index·low dispersion—-low refractive index·high dispersion type.

What is claimed is:

1. A method for manufacturing a gradient index optical element, comprising the steps:
   forming a porous body having a first predetermined concentration distribution due to a first dopant incorporated into said porous body;
   dipping said porous body in a solution containing a second dopant to establish in said porous body a second predetermined concentration distribution due to said second dopant; and
   fixing said first and second concentration distributions in said porous body.

2. A method for manufacturing a gradient index optical element as set forth in claim 1, wherein said first dopant is a material having ions including at least bivalent ions.

3. A method for manufacturing a gradient index optical element as set forth in claim 1, wherein said second dopant is a material having ions including at least bivalent ions.

4. A method for manufacturing a gradient index optical element as set forth in claim 2, wherein said porous body having said first predetermined concentration distribution is a gel synthesized by a sol-bel method using alcoxide as the raw material for receiving the first dopant.

5. A method for manufacturing a gradient index optical element as set forth in claim 2, wherein said porous body having said first predetermined concentration distribution is soot synthesized by a CVD method.

6. A method for manufacturing a gradient index optical element as set forth in claim 3, wherein said porous body having said first predetermined concentration distribution is gel synthesized by a sol-gel method using alcoxide as the raw material for receiving the first dopant.

7. A method for manufacturing a gradient index optical element as set forth in claim 3, wherein said porous body having said first predetermined concentration distribution is soot synthesized by a CVD method.

8. A method for manufacturing a gradient index optical element as set forth in claim 4, wherein the concentration of said first dopant gradually becomes lower from the center of said porous body toward the outside thereof, and the concentration of said second dopant gradually becomes higher from the center of said porous body towards the outside thereof.

9. A method for manufacturing a gradient index optical element as set forth in claim 5, wherein the concentration of said first dopant gradually becomes lower from the center of said porous body toward the outside thereof, and the concentration of said second dopant gradually becomes higher from the center of said porous body towards the outside thereof.

10. A method for manufacturing a gradient index optical element as set forth in claim 1, wherein the first dopant comprises at least one metal selected from a group consisting of Ba, La, Sr, Ca, Ge, Zr, Y and Zn; and the second dopant comprises at least one metal selected from a group consisting of Ta, Nb, Pb, Ti, Bi, Zn, and Zr.

11. A method for manufacturing a gradient index optical element as set forth in claim 1, wherein said porous body comprises a gel.

12. A method for manufacturing a gradient index optical element as set forth in claim 1, wherein said porous body comprises soot.

* * * * *